United States Patent

[11] 3,600,556

[72] Inventor Norbert K. Acker
Koenigstein, Germany

[21] Appl. No. 817,680
[22] Filed Apr. 21, 1969
[45] Patented Aug. 17, 1971
[73] Assignee Scanner, Inc.
Houston, Tex.

[54] APPARATUS FOR MACHINE READING RANDOMLY POSITIONED AND ORIENTED INFORMATION
47 Claims, 10 Drawing Figs.

[52] U.S. Cl. .......... 235/61.11E, 250/217, 250/219
[51] Int. Cl. .......... G06k 7/00
[50] Field of Search .......... 235/61.115; 250/236, 217 CR, 219 DD, 219 R; 315/10

[56] References Cited

UNITED STATES PATENTS

| | | | |
|---|---|---|---|
| 3,246,126 | 4/1966 | Schlieben et al. .......... | 235/61.11 |
| 3,414,731 | 12/1968 | Sperry .......... | 235/61.11 |
| 3,216,311 | 11/1965 | Bibero et al. .......... | 178/6 X |
| 3,218,441 | 11/1965 | Dersch et al. .......... | 235/61.11 |
| 3,418,456 | 12/1968 | Hamisch et al. .......... | 235/61.11 |
| 3,457,422 | 7/1969 | Rottmann .......... | 250/236 X |

*Primary Examiner*—Thomas A. Robinson
*Attorney*—Smyth, Roston and Pavitt

ABSTRACT: A device is disclosed in which an area through which data in a data field may pass, is imaged onto detectors of an image position detection device. The area image rotates and a data image therein is centered as soon as detected to rotate about its own center. Fine-position control maintains the rotating data in particular relation to readout detectors, scanning circular image tracks in the vicinity of at least one of the image position detectors.

Figures 1, 1A:
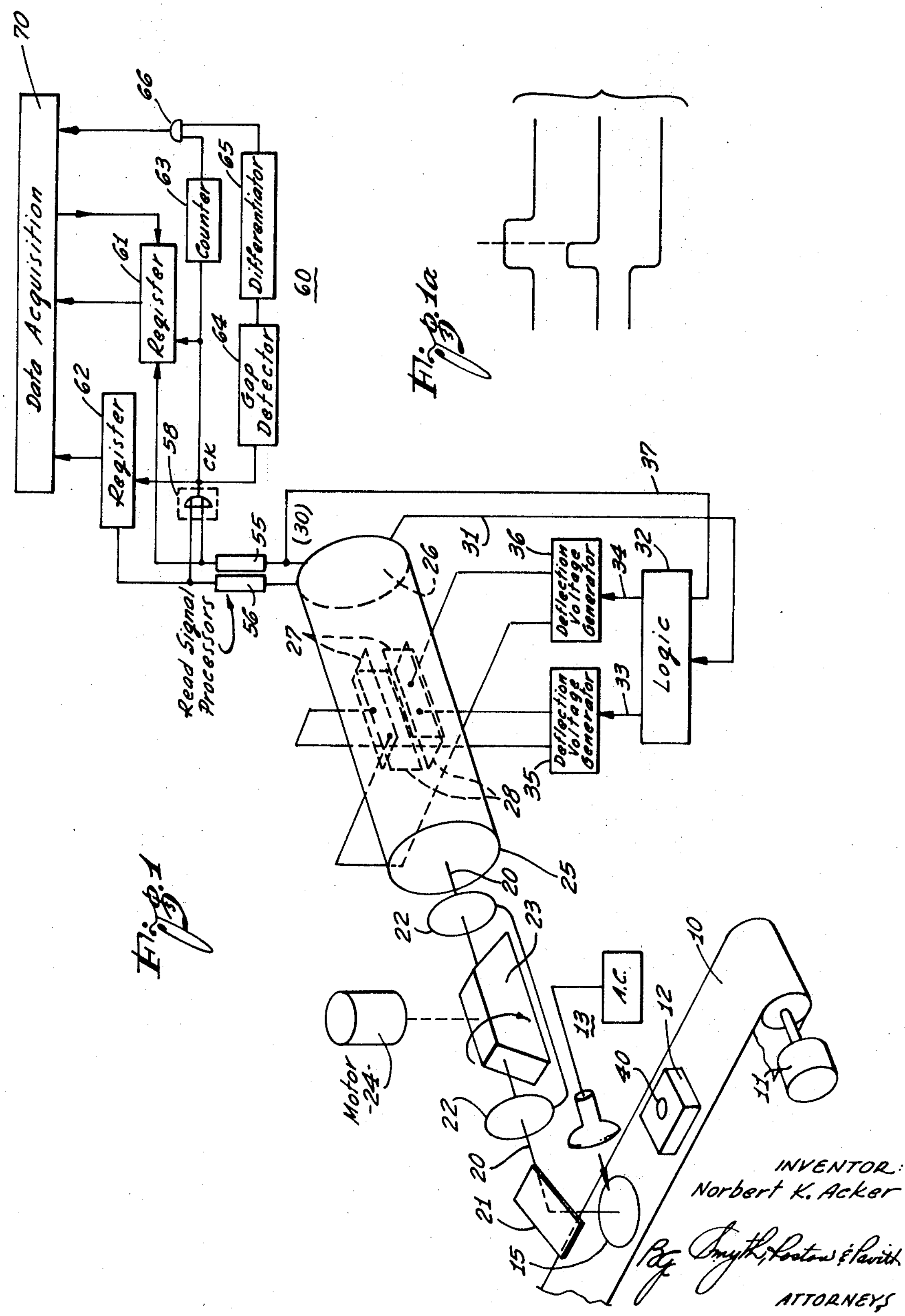

INVENTOR:
Norbert K. Acker
By Smyth, Roston & Pavitt
ATTORNEYS

| Signal | Command | Effort on Data Field Image |
|---|---|---|
| A | Down | ↓ |
| $\bar{A}$ | Up | ↑ |
| B | Right | → |
| $\bar{B}$ | Left | ← |

INVENTOR:
Norbert K. Acker

By Smyth, Roston & Pavitt
ATTORNEYS

Fig. 4
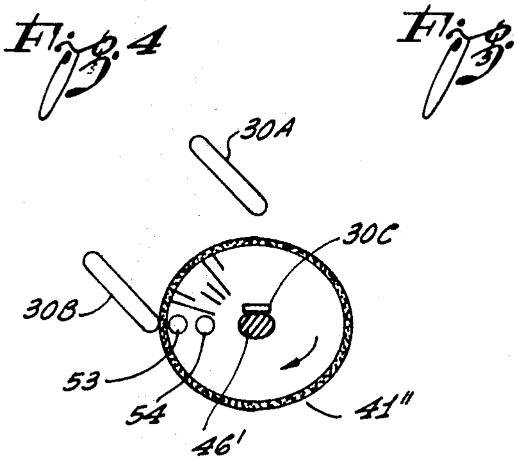
Fig. 4a
| Signal | Command | Effort on Data Field Image |
|---|---|---|
| A + C | Down | ↓ |
| Ā • C̄ | Up | ↑ |
| B | Right | → |
| B̄ | Left | ← |
Fig. 5
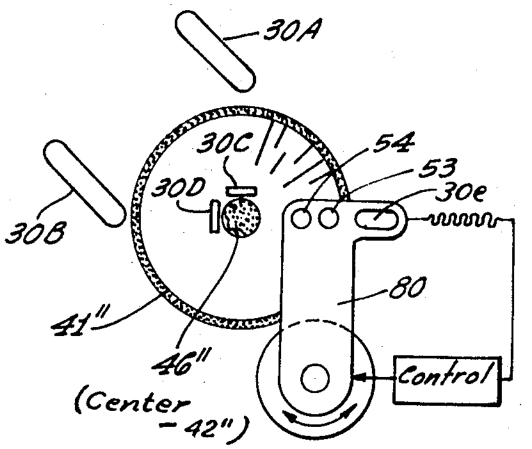
Fig. 5a
| Signal | Command | Effect on Data Field Image |
|---|---|---|
| A + C | Down | ↓ |
| Ā • C̄ | Up | ↑ |
| B + D | Right | → |
| B̄ • D̄ | Left | ← |
| E | Away from Center | 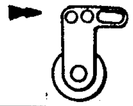 |
| Ē | Toward Center | 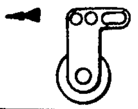 |
INVENTOR.
Norbert K. Acker
By Smyth, Roston & Pavitt,
ATTORNEYS

APPARATUS FOR MACHINE READING RANDOMLY POSITIONED AND ORIENTED INFORMATION

The present invention relates to a device and apparatus for machine reading of information having random position and random orientation when passing through a particular area. In my copending application Ser. No. 788,302 filed Dec. 31, 1968, I have proposed a system according to which an image of a data field having such random position and orientation is provided, and through lateral as well as rotary shifting of the relative position between a data field reading element, such as, a detector and such image, the data field image is particularly disposed in relation to the data reading element to obtain a proper data field readout position. It is obviated thereby to handle the data field carrier for the reading process. The present invention relates to improvements of such a system and develops the basic concept shown in the copending application further.

In accordance with the present invention, a system is suggested which is based on the proposition that the data contained in the data field is organized in relation to a particular center. For example, data bits are recorded on a plurality of concentrically arranged tracks. A particular area, also called search field or inspection zone and through which a data carrier with a data field at random position and random orientation may pass, is observed by optical or electron optical equipment. The equipment provides continuous rotation of the image of the search field, thereby, in effect, sweeping the inspection area.

As a data field enters this search field, the image thereof is likewise rotated. An image recognition device is provided and positioned in the or a search field image plane. The rotating search field image passes over detectors included in the recognition device. The recognition device will be energized accordingly if a data field has, in fact, entered the search field, and as soon as the data field image is swept over the recognition device. The recognition device controls lateral positioning of the search field image such that the data field image becomes particularly positioned (centered) in relation to data readout elements.

As a consequence of the rotation of the search field, the data field image will rotate to pass over the data readout elements, but the combined operation of continuous search field image rotation and lateral image displacement for centering the data field image under control of the recognition device operates such that the data field image in fact rotates about its own center. The data readout elements, such as, detectors are disposed radially to that center to read the data as the data field image rotates, to thereby identify the data field carrier. The recognition device is constructed such that image distortions are compensated for by continuous followup control which requires in particular that the data readout detectors are disposed in close proximity to one of the image position detecting elements within the recognition device.

The recognition device preferably includes a pair of data field image position detector elements, each controlling image deflection in one of two transverse, preferably orthogonally oriented axes in the image plane. These detectors respond to absence or presence of an increment of the data field image as a whole as it sweeps over the detectors. Additional detectors can be provided to respond to particular portions of the data field image in particular positions thereof, to fine-control the position of the data field image particularly in relation to the readout elements.

Figure 2A:
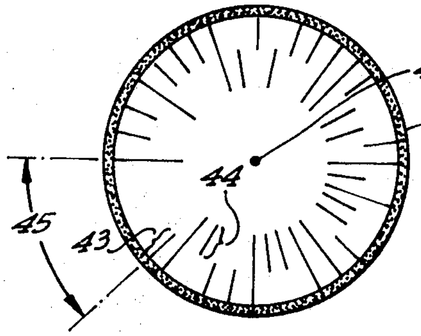
Figure 2B:
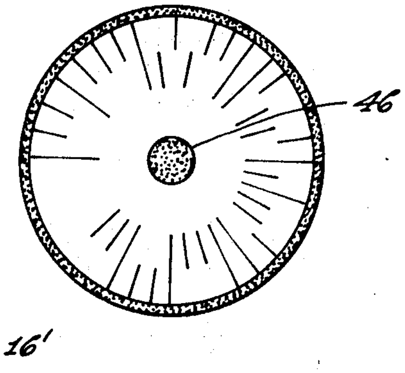
Figures 3, 3A:
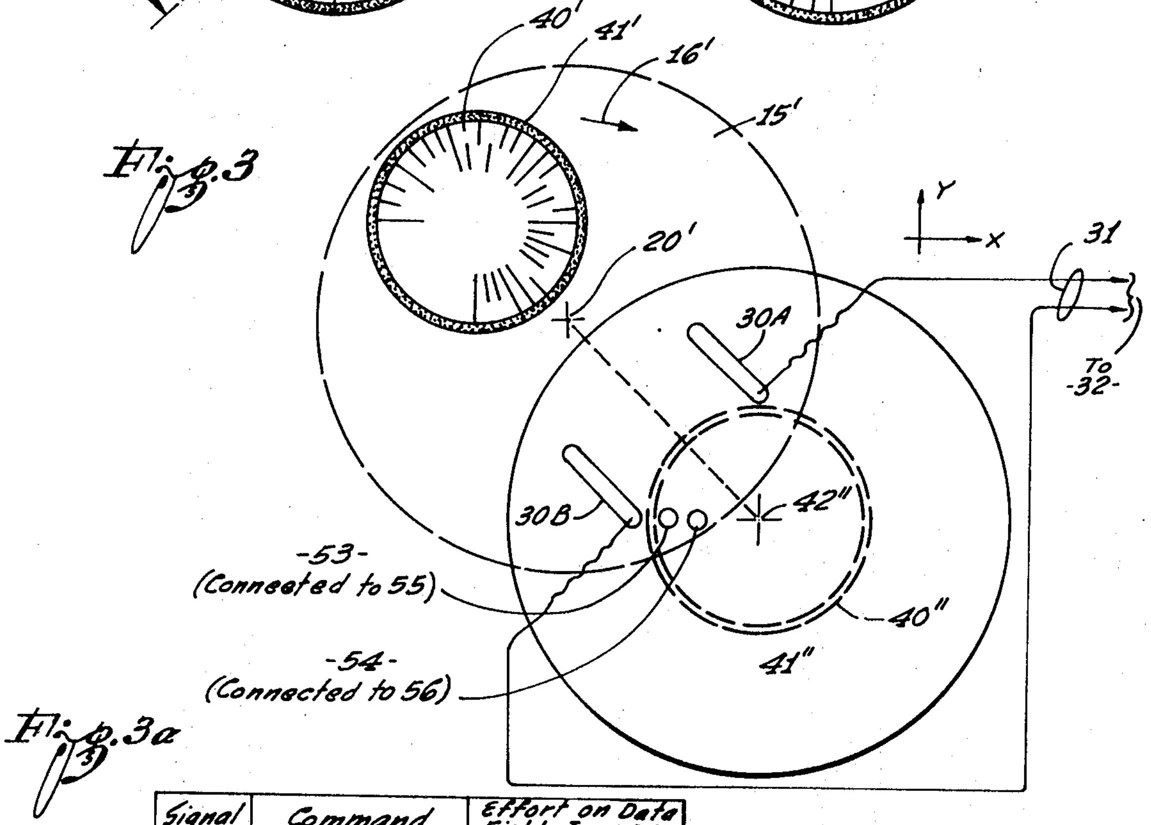

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates partially in perspective view and partially in block diagram an overall view of the system improved in accordance with the present invention;

FIG. 1*a* illustrates a timing diagram for signals developed in the system shown in FIG. 1;

FIGS. 2*a* and 2*b* are elevations of examples for data field to be read;

FIGS. 3, 4 and 5 are three different schematic representations of three data field image recognition devices for image position detection and including data field reading equipment, particularly in their relation to each other and differing by extent and degree of control they provide; and FIGS. 3*a*, 4*a* and 5*a* are tables summarizing the control effects produced with the recognition devices respectively of FIGS. 3, 4 and 5.

Proceeding now to the detailed description of the drawings, in FIG. 1 thereof there is illustrated a system in which the preferred embodiment of the present invention is practiced with advantage. There is provided a conveyor belt 10 driven by a motor 11 at constant speed or intermittently with variable speed, a slowdown occurring particularly during phases of scanning and detection operation to be described more fully below. The conveyor belt transports items 12 of merchandise, such as, packages, containers, or the like. Each of these items is provided with a data field 40 and thus serves in a general sense as a data storage carrier.

Representative examples for such data fields are shown in FIGS. 2*a* and 2*b* and will be described in detail more fully below. For practicing the invention, it is not necessary that these data fields have particular position on the items 12 except that such data fields should be on a surface of a package or container which faces generally in one direction, for example; up, without, however, requiring that these various data fields on the various packages are plane parallel.

It is not necessary that the items 12 have particular position on the conveyor belt 10 in lateral as well as in longitudinal direction as far as direction of transport movement is concerned. In particular, the items 12 and, therefore, the data fields on them do not have to be regularly spaced along the conveyor belt nor do they have to travel in aligned relationship, i.e., they do not have to travel along one particular line as far as movement of the data field centers on them is concerned.

As conveyor belt 10 moves, the packages with data fields thereon will pass through an inspection field, or inspection region 15. In view of the foregoing, data fields will appear at random times and in random orientation and position within area or region 15. The center of this inspection field may be defined by an optical axis 20. The inspection field is optically defined as to its aperture by optical and electron optical equipment disposed along the optical axis 20.

Additionally, or in the alternative, the search field 15 may be defined through illumination from a source 13. The illumination source 13 is preferably a pulsating one, either because an alternating or pulsating voltage drives the source, or by operation of a light chopper. A detected reflection resulting from such pulsating illumination includes the pulsations as a carrier frequency signal, and contrasts in the inspection field, particularly markings in a data field observed through the optical equipment on axis 20 appear as, and are represented by amplitude modulations of such carrier frequency signal.

A mirror 21 may be provided to redirect the optical axis. The optical image producing equipment on the axis will preferably be disposed in a horizontal orientation, and the data fields are presumed to be on top of the various containers. This orientation is basically immaterial in principle. A lens system 22 images the search field 15 onto the input side of an image converter 25. The search field or inspection zone 15 may, therefore, be defined by the effective aperture of optical system as defined by mirror 21 and lens 22. A dove prism 23 is included in the optical path near or in lens system 22, which dove prism is driven by a motor 24 about the optical axis 20 as it extends through the prism 23. As a consequence, optical system 22 and 23 provides a continuously rotating image of the search field 15 onto the optical input side of image converter 25.

The image converter 25 can be of general construction, and it includes an exit or target screen 26 onto which an image of the search field is produced electron optically. Image converter 25 is presumed to include electron optical equipment permitting lateral deflection of the electrons producing the image and, therefore, of the image itself. The tube includes, for example, two pair of deflection electrodes; there is a pair 27 for vertical deflection and a pair 28 for horizontal deflection of the image as produced onto screen 26. The terms, vertical and horizontal, are used here only in relation to the illustrated directions. In general, these two deflection systems 27 and 28 provide lateral image displacement in the image plane of converter 25 and in two orthogonal directions.

Details of target screen 26 will be discussed more fully below. Presently, and for describing the overall system, it suffices to said that screen 26 includes a recognition device 30, or more particularly, a data field image detection and recognition device providing output signals through a cable 31 to a logic circuit 32 for processing therein. The recognition device 30 includes always detectors 30*a*, 30*b*, with additional detectors 30*c*, 30*d*, and 30*e*, provided in cases and as will be described below. In essence, the output signals as provided by the various detectors in the recognition device pass through cable 31 and define the relative position of a data field image on the target screen 26 and are processed in the logic circuit 32 in order to control image deflection during operation. Basically, the logic circuit 32 has two output channels 33 and 34, respectively controlling deflection control circuits 35 and 36, which, in turn provide deflection voltages to the electrode pairs 27 and 28 respectively. Details of this control and representative examples thereof will be discussed more fully below.

Either on target screen 26 itself or in juxtaposition thereto there are provided two detectors 53 and 54 for reading data field images when projected in particular position also to be discussed more fully below.

Before proceeding to the description of the data readout circuit, reference is made to the FIG. 2, showing various configurations for data fields. Common to these configurations is that the data are printed, written, or the like, within a circular area circumscribed by a narrow, ring-shaped outer boundary 41. Boundary 41 serves as a definition marking for the data field as including a circular arrangement of data. The ring 41 has thus an outer circular contour that extends around a center 42 which per se does not have to be represented physically or as a particular marking. The data themselves are contained in two tracks 43 and 44 extending parallel to the boundary 41 and its contour and concentrically around the center 42.

The data on these tracks 43 and 44 are defined by contrast producing markers extending radially in relation to center 42. The contrast producing markings on the tracks represent one bit value; absence of a marking in a bit position, particularly in a bit position radially aligned with a bit defining marker, defines the other bit value, assuming that bivalued bits are used for encoding.

There is a data gap 45 represented by the absence of markings defining contrast producing bits. This gap defines beginning and end of the circularly arranged data and, therefore, the gap defines the angular orientation of the data field. In lieu of a gap, there could be markings which do not represent data characters, such as a particular bit sequence on each or both of the tracks. Still, alternatively, the gap could be solidly black, producing contrast just as the contrast producing bit markings do. For reasons of describing the embodiment of the invention, it is assumed that, in fact, there is a data gap 45 represented by the absence of the contrast producing markings.

An image of these two data tracks is projected onto target screen 26 and is read out by the two detectors 53 and 54, provided the image rotates about its own center 42 (i.e., the image point corresponding to center 42) and provided further that the two detectors 53 and 54 are positioned in radial relation to that center of rotation as projected onto the target screen 26 and respectively having the same distances therefrom the two tracks 43 and 44 have from the center multiplied by the magnification of the image producing and projection system.

It, therefore, appears that the detectors 53 and 54 provide signals representing the passage of contrast producing markers in the tracks as the data field image rotates over the detectors. In addition, the detected signal has the modulation frequency as provided by the AC illumination system 13, and locally variable reflection resulting from absence or presence of contrasting markings and images thereof provide amplitude modulation of such carrier signal. Therefore, the detector output signals are respectively fed to demodulating circuits 55 and 56 which are presumed to include tuned amplifiers, i.e., amplifiers tuned to the carrier frequency as provided by the pulsating light source with a bandwidth which reflects the bit rate frequency as the images of the data tracks rotate past the detectors.

The circuits 55 and 56 include amplitude demodulation and low pass filters for demodulation of the signals as provided by the detector 53 and 54. The output signals of the data read signal processing channels 55 and 56 can be regarded as logic signals; for example, as a detector (53 or 54) detects a contrast producing marker, a first level is established at the output side of the respective processing circuit, 55 or 56, while a second level is provided as long as the respective detector connected to it detects only a background of the data field area.

Read signal processing channels, 55 and 56 serve as inputs for the data assembly and processing circuit 60. The data are encoded for example in such a manner that a contrast producing marking is in at least one of two radially aligned bit positions along a data field track outside of gap 45. An OR circuit 58 is connected to the output side of the two read signal processing channels 55 and 56 and provides a trigger signal for a single shot or monovibrator producing a pulse of short duration at each leading edge of a demodulated pulse representing a contrasting data bit and to serve as clock pulses CK representing such bit position. The data processing circuit 60 includes a first register 61 and of a second register 62. These two registers are shift registers and respectively connect to the output sides of the two read signal processing channels 55 and 56 to receive input signals therefrom. In addition, the registers receive the clock pulses CK for input and shift clocking.

The circuit 60 may include a counter 63 preferably provided in order to determine the total number of bits read from a data field and/or to determine repeatedly a particular number of bit pairs as set into registers 61 and 62 for character assembly and decoding control. The counter can be instrumental in testing operations to check that the data read meet particular format requirements. Presently, it is presumed that counter 63 provides a signal for an AND gate 66 after a predetermined number of clock pulses has been counted or after a predetermined number of counted clock pulses is exceeded.

In addition, the circuit 60 includes a gap detector 64 which can be regarded as a series circuit of a reset integrator and of a Schmitt trigger. The reset integrator within the gap detector 64 receives clock pulses CK and is reset to start anew with each such clock pulse. In the absence of clock pulses, i.e., during detection of gap the reset integrator is permitted to run until reaching the trigger level of the Schmitt trigger in gap detector 64; thereupon the Schmitt trigger provides a logic signal effective at the output side of the gap detector. A delay circuit 65 may be connected to the gap detector to respond to the leading edge of the gap detection signal to reset registers 61 and 62 so as to eliminate spurious or unwanted previously received signals therefrom.

The gap detector 64 serves to provide a phase signal for readout processing. At the rising flank of the first clock pulse CK after a gap, detector 64 is reset to zero and the Schmitt trigger therein changes level instantly. This ten is an indication that the rotation of the data field image has progressed to a point that now the first data bit or bits are presented to the readout circuit.

FIG. 1*a* illustrates representatively this operation. A data pulse produced in the readout circuit 55 or 56 in response to a contrast producing, bit defining marker is shown in time amplitude relation on the top line. The signal plotted in the line below is the resulting clock pulse CK. The third line of FIG. 1*a* shows the output of gap detector 64. The output signal of the gap detector changes level right at the leading edge of the first data bit and clock pulse. Therefore, one can see that the gap detector 64 can provide a disabling signal during gap detection. The gap detector output drops sufficiently early so that the detection circuit can be enabled in response thereto.

At the trailing edge of the first clock pulse CK, the output as still provided by the read signal processing channel 55 and 56 is gated and clocked into the input stages of registers 61 and 62. Upon comparing the two top lines in FIG. 1*a*, it can be seen specifically that the trailing edge of clock pulse CK occurs when the signal level of channel 55 and/or 56 is still determined by a contrast producing marker as its width (divided by the image speed) is presumed larger than the clock pulse duration. It follows that bits are properly set into registers 61 and 62, and others follow in the order of presentation to detectors 53 and 54.

As now the data field image rotates over data read detectors 53 and 54, data are sequentially clocked into and shifted through the shift registers 61 and 62. After the data have all been read, the gap will reappear and soon gap detector 64 responds. The gap signal serves as second input for gate 66. This gate provides a true output only if at the time of gap, counter 63 has counted the desired and required or minimum number of bits read. In the format, i.e., the number of bits present in the data field is fixed, counter 63 may respond to that number only so that gate 66 is true only after a complete readout of the entire data field. If the format of the data field is not predetermined exactly, counter 63 will be required to count only up to a predetermined minimum number of bits expected to be always included in a data field before enabling gate 66.

If the data format is fixed and if counter 63 is set to produce an output after the complete number of characters has been counted, the first true signal of gate 66 signals completion of character assembly in registers 61 and 62. If the format is not fixed and counter 63 counts only a minimum number of characters, a full true output of gate 66 is required signal for signalling the beginning of data assembling; a subsequent, second output of gate 66 signals the end and completion thereof.

The output signal or signals of the gate 66 is provided to a data acquisition device 70 as signal of beginning and/or end of readout signal assembly in registers 61 and 62. It is up to the acquisition device to interpret these signals, to determine when the data read from a data field are in registers 61 and 62 and can be transferred to the acquisition device 70 for proper decoding, registration and other processing as the case requires. The delay provided by circuit 65 before resetting the registers 61 and 62 should be long enough so that acquisition device 70 has copied the content of the registers. Alternatively, the registers could be reset by a signal developed in the acquisition device.

After having described the data readout process, I will now proceed to the details of the centering control of the data field image position, the search sweep operation and the readout control. This requires particular consideration of the configuration of the target screen 26 of electron optical converter 25. The input of recognition device 30 includes particularly two oblong electrodes 30*a* and 30*a* as illustrated in FIG. 3. Rules for these detector electrodes will be developed below. Each of them extends asymmetrically to directions $x$ and $y$, defining a coordinate system in the image place on screen 26 and as lateral displacement and shifting directions for the image. Particularly, image deflection devices and 27, respectively, shift an electro-optically produced image, in the $x$ and $y$ directions on screen 26. The asymmetry of the individual electrodes relative to the $x$ and $y$ directions is not essential.

The detector elements 30*a* and 30*b* connect through suitable signal lines as included in cable 31 respectively, to logic 32. It is presumed that the input circuit for logic 32 includes AC processing circuits, amplifiers, demodulators, etc., to extract the image representing signals as logic signals from the counter modulated signals provided by the detector elements.

In the normal or resting position of the system, the optical axis 20 is imaged onto the point 20'. Therefore, the search field is imaged onto screen 26 in an area circumscribed by a dotted line. By operation of rotating dove prism 23 this search field image rotates, for example, in the direction indicated by the arrow 16, and around image point 20'. It is essential that at least one of the two electrodes 30*a* and 30*b* is within that image field, and extends towards point 20' to have a distance therefrom smaller than the diameter of a data field image.

As an item of merchandise with a data field 40 enters the search field, it may at first be imaged as shown at 40' in FIG. 3. However, the image 40' of data field 40 sweeps around the center 20'. Therefore, in the normal course of rotation image 40' will first encounter electrode 30*a*, producing a signal accordingly in output line 31*a*. Assuming nothing happens as far as image deflection is concerned, the data field image will continue to rotate and will encounter electrode 30*b*, and whenever that happens, a signal is produced in line 31*b*, accordingly.

Whenever a signal is received by one or both or none of the electrodes 30*a* and 30*b*, the logic circuit 32 processes these signals to control or trigger the deflection control circuits 35 and 36 in accordance with the following rules. If a signal is produced by electrode 30*a* particularly in response to image 41' of a strongly contrasting boundary ring 41, control 35 causes electrode system 27 to provide image deflection in direction of vertical direction −Y to deflect the search field, in the drawing in down direction. That down shift continues as long as electrode 30*a* is energized by some portion of the data field image. The down shift particularly persists regardless of the still continued rotation of the data field image within the search field image and regardless of the propagation of the data field through the search field. The complementary control is such that in the case a signal in not produced by electrodes 30*a*, the vertical deflection control 35 causes deflection system 27 to move in the direction +Y. It follows, therefore, that as long as no data field image is detected, the deflection system causes the search field image to be in the upper limit position of vertical deflection control and as defined above as the normal or resting position illustrated at 15'.

Analogously, if an image of a data field, particularly of boundary 41' thereof is received and detected by electrode 30*b*, a trigger signal is provided to the control circuit 36 for operating the horizontal image deflection electrodes 28 to move the search field image to the right, corresponding to a +X direction. When no data field image increment is detected by electrode 30*b*, the horizontal deflection control 36 operates deflection electrodes 28 to shift the image to a leftmost position.

It follows, therefore, that the control operates such that a −Y deflection of the search field image is stopped as soon as the data field image has been shifted down to such an extent that an image leaves or tends to leave the lowest point of electrode 30*a*. Correspondingly, the search field image is shifted to the right until the data field image therein, particularly the image of the contrast producing boundary 41 thereof, tends to leave the rightmost point of electrode 30*b*, whereupon the image or the search field is shifted back towards the left.

The table of FIG. 3*a* summarizes the control action resulting from data field image detection by the electrodes. The detection is symbolically represented in the left-hand column as true and false states. The second column defines mnemonically the resulting command given to deflection controls 35 and 36 by the logic 32, and the third column illustrates symbolically the resulting data field image shift. The position illustrated with 40'' in FIG. 3, indicates the resulting desired position of the data field image wherein the image 41'' of the data field boundary is tangent to the lowermost point of electrode **30*a* as well as to the rightmost point of electrode 30*b*** by operation of the two deflection controls.

The equilibrium position for the data field image is maintained dynamically as it is assumed that the data field propagates translatorily through the search field and does not necessarily stop therein. Moreover, its center may, but in the general case will not, propagate through the optical axis 20 so that the data field image does not rotate per se around its own center, but always about the image of the optical axis which may only temporarily coincide with the data field image center. These two movements on the data field image, translation and rotation, tend to shift the data field image out of the desired position (40''). It is, however, presumed that the deflection control and image deflection operates considerably faster to continuously return to and, in fact, maintain the data field image in the desired position as a result of the two-dimensional followup control.

As a compound result of rotation and deflection, the data field image is maintained in a position so that the image of the boundary 41' is maintained tangent at electrodes **30*a* and 30*b*, and the data field image rotates about the image 42'' of the data field center. This does not means that the search field center of rotation 20' is imaged onto the point 42'', but the combined rotation of the search field image about its center and of the deflection due to follow up control causes, in fact, the data field image to rotate about its own center 42''**.

The two data field readout detectors 53 and 54 are positioned on a radius extending from the image point 42'' of the data field center towards one of the image position detectors, **30*a*, and at distances from the center equal to the respective radii of tracks 43 and 44**, multiplied by the image magnification provided by the entire imaging and projection system. As the data field image rotates, the detectors each read the track images serially, and in parallel as to radially aligned but positions.

It follows, therefore, that in view of the various cooperating components, a data field when entering the search field enters in fact a sweeping search field, as far as recognition device 30 is concerned, because the search field image sweeps continuously over electrodes **30*a* and 30*b* of the recognition device. On basis of the principle of optical inversion, it follows that the data field detectors 30*a* and 30*b* appear to sweep continuously over the search field. As soon as a data field is detected, the image deflection system deflects the search field image to position and maintain the data field image symmetrically between and tangent to the two electrodes 30*a* and 30*b* as illustrated at 40''. In addition, by operation of the continued rotation, the data field rotates about its own image center so that the data on each of the two imaged tracks are read out serially by the two detectors 53 and 54**.

Without intending to restrict the possibilities of practicing the invention, it is pointed out that FIG. 3 (and also FIGS. 4 and 5) are schematic in nature, particularly with regard to detector elements **30*a*, 30*b*, 53 and 54. These elements can, in fact, be electrodes responding directly to the impingement of electrons focused onto target screen 26 by operation of the optical-electron image producing process of tube 25**. Alternatively, these elements may actually be areas of fluorescent layering, each converting electron image increments produced on them into optical image increments and the fluorescent layer is separately observed outside of the tube by suitably positioned photoelectric detectors now producing the required output signals.

From the standpoint of readout, the two detectors 53 and 54 could be located anywhere on the track images of a properly positioned data field image. However, the illustrated position is preferred because fine control is obtainable thereby. Through DC processing of the readout signal from detector 53, a logic signal can be developed corresponding to the position of a boundary ring image relative to the readout detector 53 for the outer track. This is illustrated in FIG. 1 symbolically by the signal line 37, linking the data readout circuit with logic 32. The logic circuit 32 may DC—process the signal to eliminate bit rate modulation therefrom and to turn true when any contrast (at carrier rate) is observed by detector 53, for tending to shift the search field image on target screen 26 to the left. This aids in positioning the data field image right at or near the data readout detectors as required.

FIG. 4 illustrates schematically an improvement of the recognition device, which, in particular, takes care of the fact that the data field image may be distorted due to an oblique position of the data field relative to optical axis 20 defining a plane for search field 15. Also, such a distortion will result if the search field is rather large, the optical system having a wide angle aperture accordingly. In either of these cases the circular data field will be imaged elliptically.

An elliptical data field image cannot be maintained tangent to both electrodes **30*a* and 30*b* while maintaining the center of the data field image on a line through detectors 53 and 54, without additional measures. The elliptically distorted data field image as shown in FIG. 4 is illustrated therein in proper readout position, without being tangent to electrode 30*a*. Without further measures, however, the image position control as aforedescribed will tend to shift the image to become tangent to electrode 30*a*. This, in turn, would shift the image 41'' of boundary 41 out of contact with electrode 30*b* and a shift to the left of the image will result. It follows that the resulting positioning of the elliptically distorted image is such that data read detectors 53 and 54** will not have the proper position in relation to the track images, particularly if the elliptical distortion is as severe as illustrated.

In order to avoid situations as aforedescribed, it is suggested to provide the data field with a central marker 46, as illustrated in FIG. **2*b*. This additional control marking is a circular, centrally located contrasting area in the data field. The desired image position as shown in FIG. 4 can now be maintained if the recognition device includes another detection electrode 30*c*. Proper data field image position is now established if the relatively small electrode 30*c* is tangent to the edge of the image of central marking 46. The control provided by the logic circuit 32 in this case is such that if either electrode 30*a* or electrode 30*c* detect any contrasting increments of the data field image, the deflection control 35 for vertical deflection system 27 causes the image to be moved down, i.e., in the direction of −Y. In particular, when either electrode 30*a* or electrode 30*c* detects image increments of the data field, logic circuit 32 provides the logic OR function for the signals from these two electrodes to trigger vertical deflection control 35 for causing the data field image to shift down. Conversely, the vertical deflection control is operated to deflect the search field and data field images in the up direction (+Y) in case electrode 30*a* and electrode 30*c*** each do detect any data field image increments ($\overline{30a}.\ \overline{30c}=1$).

The horizontal image deflection control is the same as explained above, with reference to FIG. 3. It can be seen that the extended recognition device in accordance with FIG. 4 compensates only image distortion such that the data field image distorted as illustrated in FIG. 4 has overall correct position. After having rotated by 90° the position control will shift the image and particularly the center thereof somewhat to the left. Moreover, the tracks, as well as their distance from each other, will be somewhat contracted in that direction, i.e., in the radial direction along the arrangement of the data read detectors. Thus, the markers on the inner track may appear partially under the outer track reading detector 53, if the detectors are very closely spaced, so that, for example, the normal image of the data field track is about equal to the diameter of each of the detectors 53 and 54.

The read error resulting from such track contraction can be obviated by making the detectors 53 and 54 smaller, particularly in radial direction.

However, too small detectors for data reading require too much amplification of the readout signals which deteriorates the signal-to-noise characteristics of the system. A more sensitive system permitting, therefore, a larger range of distortion without complementary reduction in the size of the data read detectors is illustrated in FIG. 5.

The recognition device shown in FIG. 5 includes all of the elements shown in FIG. 4 but is supplemented by another electrode *30d*, positioned essentially orthogonally to the electrode *30c*. The control in the horizontal is now analogous to the vertical control in this system as in the system of FIG. 4. The data field image is vertically positioned in that the image of marking 46 remains tangent to electrode *30c*. The horizontal deflection system is triggered to shift the image to the right in case either electrode *30b* or electrode *30d* (or both) detect data field image increments. Correspondingly, the image is shifted to the left in case electrode *30b* does not detect an image increment and electrode *30d* likewise does not detect a data field image increment. The table of FIG. *5a* summarizes the operation. In this way, the data field image remains centered in that its center is continuously controlled to be positioned in one particular position, regardless of distortion.

The read head in this case is now comprised of a separate element 80 on which the electrodes 53 and 54 are mounted. Element 80 is pivotally disposed or disposed for radial shifting of the two detectors 53 and 54 so that they can be moved closer to or away from the center 42''. For this there is provided a detector *30e* on the detector mount 80 which responds likewise to the image of the boundary ring 41. The output signal of detector *30e* is amplified and processed, as described, and controls a deflection mechanism to pivot detector mount or detector carrier 80 so as to move the two detectors 53 and 54 towards the center 42'' when not detecting data field image increment. In case detector *30e* does detect a data field image increment, particularly of the boundary ring 41 thereof, complementary control tends to move or pivot the carrier 80 so that the detectors 53 and 54 are moved away from the center 42'' of the data field image. The control range for motion of this carrier 80 can be very small, as this fine position control merely compensates for image distortions, not for lateral overall displacements of the data field image.

From a different point of view, it appears that in case of FIG. 4 and FIG. 5, electrodes *30a* and *30b* provide a coarse control, detecting particularly initially the presence of a data field within the search field as a result of the search field sweep. After having coarsely positioned the data field image, the fine control provided through the electrode *30c* (FIG. 4) or electrodes *30c*, *30d* and *30c* (FIG. 5) take over to maintain the image of the data tracks in proper position relative to the detector heads.

It should be mentioned that detector carrier 80 should be mounted inside of image converter tube 25 if the detector electrodes *30d*, 53 and 54 respond electrically to the electron image produced by the image converter tube. Alternatively, the area of target screen 26 adjacent to which detectors 53 and 54 are expected to be positioned, may be provided with a fluorescent layer which responds to the focused electrons and produces a visible image of the passing data track portions. In this case, the data detectors will be photoelectric detectors positioned on the carrier 80 outside of tube 25.

I claim:

1. Apparatus for reading information in a data field having random position in a particular area, comprising:

first means disposed to provide a laterally displaceable image of the particular area including a data field when in the particular area said data field being capable of displacement along first and second directions;

second means including a first detector and connected to the first means to cause moving of the data field image in a first direction when detecting the data field image, and in the opposite direction in the absence of detecting the data field image;

third means including a second detector connected to the first means to cause moving of the data field image in a second direction when detecting the data field image and in the opposite direction in the absence of detecting the data field image;

fourth means including additional detection means connected to the first means to cause a particular image portion of the data field image to be maintained in a particular image field region independently from image distortions and overriding the control as provided by at least one of the fist and second detectors; and means positioned to read data from the data field when its image is tangent to the additional detector means and at least one of the first and second detector means.

2. Apparatus as set forth in claim 1, the data field having a contrasting boundary in the confines of which are contained the data proper, the data field read means positioned in particular relation to an image of the boundary when the data field image has the particular position.

3. Apparatus as set forth in claim 2, the first means including means for providing rotation of the data field image.

4. Apparatus as set forth in claim 3, the data read means disposed for variable position relation between the center of rotation of the data field image.

5. Apparatus as set forth in claim 2, the data field having a central marker for fine control of the center of the data field image, the additional detector means responsive to the image of the central marker controlling the first means so that the central marker image remains tangent to the additional detector means.

6. In combination for reading, from a data carrier, information in a data field selectively identifying the data carrier and having random position and orientation and where the data field is identified by a first marking defining a loop of a particular contour and a second marking disposed within the loop and where the data field is disposed along the loop:

first means defining an optical path and including identifying means, the optical path extending between the identifying means and a particular area in which the carrier may appear at random times to optically relate the area to the identifying means, there being contour distortions of a loop in the particular area as related to the identifying means, the identifying means for reading the information selectively disposed in the data field on the data carrier, first and second recognition means included in the optical path and respectively responsive to the first and second markings for producing signals in accordance with the disposition of the respective markings relative to the recognition means, means responsive to the signals produced by the first and second recognition means for providing for an adjustment of the optical relation between the markings and the first means in accordance with the relative characteristics of the signals produced on the recognition means by the recognition markings to produce a particular relationship between the recognition means and the markings, and means responsive to the particular relationship between the recognition means and the markings for moving the recognition means relative to the markings as optically related to maintain the particular relationship between the recognition means and the markings even at distorted contour of the first recognition marking during reading of the information by the identifying means.

7. The combination set forth in claim 6, wherein the first recognition means include at least a pair of recognition elements and the second recognition means constitutes an additional recognition element and wherein the adjusting means are responsive to the signals produced by one of the recognition elements in the pair and the additional recognition element for providing for an adjustment in the disposition of the recognition means relative to the recognition marking along a first one of a pair of transverse axes and are responsive to the other one of the recognition elements in the pair for providing for an adjustment in the disposition of the recognition means relative to the recognition markings along the other one of the pair of transverse axes.

8. The combination set forth in claim 6 wherein means are responsive to the signals from the identifying means to adjust the disposition of the identifying means relative to the selective information in the data field to maintain a particular relationship between the identifying means and the selective information.

9. In combination for reading, from a data carrier, information in a data field selectively identifying the data carrier appearing at random times in a particular area in random position and orientation and where the data field is identified by a particular contrasting contour and where the selective information is disposed adjacent the particular contour of the recognition marking:

means disposed for reading the selective information in a data field, first means defining an optical path of variable direction as between the reading means and the particular area through which a data field may pass, for optically relating the area to the reading means, recognition means included in the optical path and responsive to the contrasting contour for providing for an adjustment of the optical relation between the contour and the first means to a particular relationship in accordance with the relative characteristics of the signals produced on the recognition means by the recognition marking, means responsive to the particular relationship between the recognition means and the contour for producing a movement of the recognition means relative to and toward the contour as optically related by the first means to detect and to follow the particular contour of the recognition marking, and means responsive to the signals produced by the recognition means during the relative movement of the recognition means along the particular contour for maintaining the recognition means in the particular relationship to the contour during such movement, thereby maintaining a particular relationship between the means for reading and the data field as optically related thereto by operation of the first means.

10. The combination set forth in claim 9, wherein an additional recognition marking is provided and wherein additional recognition means are included in the optical path and are responsible to the optically related recognition marking for providing additional controls to maintain the particular relationship between the recognition means and the optically related recognition markings.

11. The combination set forth in claim 9 wherein means are responsive to the signals produced by the identifying means for adjusting the disposition of the identifying means relative to the selected information in the data field to maintain a particular relationship between the identifying means and the selected information.

12. In combination for reading, from a data carrier movable along a conveyor line, information in a data field selectively identifying the data carrier where the data field is identified by a recognition marking:

means for identifying information selectively disposed in said data field, first means defining an optical path between the identifying means and a particular area along the conveyor line to optically relate the area, including said data field when in the area, to the identifying means, recognition means included in the optical path and responsive to the recognition marking for providing for an adjustment of the optical relation between the recognition marking and the first means along a pair of transverse axes in accordance with the relative characteristics of the signals produced on the recognition means by the recognition marking, second means responsive to the characteristics of the signals produced by the recognition means for adjusting the optical relation between the recognition marking and the first means to produce a particular disposition between the recognition marking and the recognition means disposed in the data field on the data carrier, the identifying means being disposed on one side of the recognition marking as optically related by the first means, and the recognition means being disposed on the opposite side of the recognition marking as optically related by the first means in the particular disposition of the recognition marking as optically related by the first means and relative to the recognition means, third responsive to the adjustment between the recognition marking and the recognition means to the particular disposition for obtaining a movement of the recognition means relative to the recognition marking, fourth means responsive to the adjustment of the optical relation between the recognition marking and the first means to the particular disposition and responsive to the signals from the recognition means for obtaining the particular disposition between the recognition means and the recognition marking during the operation of the third means, to maintain the recognition marking between the recognition means and the identifying means, and fifth means responsive to the adjustment of the optical relation between the recognition marking and the first means to the particular disposition for obtaining an operation of the identifying means in identifying the information selectively disposed in the data field on the data carrier.

13. The combination set forth in claim 12 wherein the marking is circular and wherein the recognition means constitute at least a pair of elements disposed exterior to the marking in the particular disposition of the recognition marking relative to the recognition means and the identifying means constitute at least a pair of elements disposed within the recognition marking, 14. The combination set forth in claim 13 wherein the adjusting means are responsive to the signals produced by the pair of recognition means to adjust the position of the recognition means relative to the recognition marking along a pair of transverse axes.

15. The combination set forth in claim 13 wherein the identifying means are independently adjustable relative to the selective information to maintain a particular relationship between the identifying means and the selective information even during the relative movement between the recognition means and the recognition marking.

16. The combination set forth in claim 13 wherein at least an additional recognition marking is displaced from the first recognition marking and wherein additional recognition means are responsive to the additional recognition marking to operation in conjunction with the first recognition means in controlling the operation of the fourth means.

17. Apparatus for reading information from a data field, the location of the information being identified by marking having a particular contour, comprising:

first means for producing a laterally displaceable image of the particular area including an image of a data field when in the particular area, the image of the contour marking being subject to distortion in dependence upon the position of the data field in the particular area at any instant;

second means disposed to be responsive to the image of the contour marking and coupled to the first means to shift and to move the image of the recognition marking along a particular position so that the portion of the image of the contour marking in the vicinity of the particular position remains independent from the distortion; and third means disposed to be responsive to the portion of an image of the information contained in the imaged data field in the vicinity of the particular portion of the image of the contour marking that is in the particular position.

18. Apparatus as set forth in claim 17, the second means including means (a) responsive to the overall position of the image of the recognition marking and means (b) responsive to distortions of the image of the recognition marking for controlling the first means.

19. Apparatus as set forth in claim 17, the recognition marking having circular contour, the first means including means providing rotation of the image of the data field when in the particular position and about the center of the image of the circular contour, and means included in the apparatus responsive to elliptical distortions of the image of the recognition marking, to control the first means so as to prevent radial displacements of the image of the boundary marking where passing a particular point, the third means disposed, particularly in relation to the particular point.

20. Apparatus as set forth in claim 17, the recognition marking having circular contour, the first means including means providing rotation of the image of the data field when in the particular position and about the center of the image of the circular contour, and means included in the apparatus responsive to elliptical distortions of the image of the recognition marking to provide radial shift between the data field image and the third means counteracting the radial displacement of the rotating information image resulting from the elliptical distortion.

21. A device for reading information established by data markings in a data field on a carrier, the carrier having random position and random orientation in a particular area and appearing at random times within that area, the data field position identified by particular contour marking having particular spatial orientation to the disposition of the data markings in the data field, the combination comprising:

first means disposed in relation to the particular area and having particular configuration and characteristics for reading information and providing signals representative thereof;

second means defining an optical path between the particular area and the first means and providing an image of the area and of a data field with its data markings when in the area, the second means including adjusting means in the optical path for displacing the image relative to the first means, the adjusting means including means (a) for laterally shifting the image in two transversely oriented directions relative to the first means, and means (b) for rotating the image relative to the first means;

detector means including a plurality of individual detectors disposed on the optical path as provided by the second means to be responsive to an image of the particular contour marking of a data field when in the area and providing control signals having characteristics representative of the relative position of the image of the contour marking in representation of the disposition of the image of the data markings of the data field relative to the first means;

first control means connected to the detector means to be responsive to the characteristics of the control signals of detector when representing absence of an image of the particular contour marking by the detector means, to particularly operate the adjusting means for causing the image of the area to sweep in periodic progression across the detector means; and second control means connected to the detector means to be responsive to the control signals for operating the adjusting means upon detection of an image of a particular contour marking when in the area, to laterally shift and to rotate the data field image relative to the first means to obtain passage of the image of the data markings of data field whose contour marker has been detected by the detector means, progressively past the first means to obtain data readout.

22. A device as in claim 21, the second control means causing the image of the contour to move in direction of the contour, the data markings arranged in tracks along the contour, the first means providing signals in representation of serial readout of the tracks.

23. A device as in claim 21, the data field outlined by a closed contour marking, the data markings disposed along at least a part of that contour, the detector means including a detector providing a control signal causing the adjusting means to maintain the contour image tangent to the detector, the adjusting means further operating to move the image of the contour periodically along the detector, the first means disposed in the vicinity of the detector for reading the data marking image during the moving and essentially undistorted.

24. A device as in claim 21, the data markings disposed along the contour, of the particular marking, the first means including at least one read detector, the detector means including a first detector, arranged on an axis with the read detector and in vicinity thereof, the detector means including at least one additional detector, the first and the additional detector providing control signals to the second control means for causing the adjusting means to orient the contour image to align transversely so that axis, tangent to the first detector, and to move the data field image transverse to said axis.

25. In a combination for reading, from a data carrier information in a data field selectively identifying the data carrier where the location of the data field is identified by a particular marking having particular relation to the data contained in the data field, the carrier appearing at random times and at random position within a particular area:

first means disposed in relation to the particular area to provide a rotating image of the particular area, a data field in the area being normally excentrical to the axis of rotation as projected to the object side;

a plurality of individual recognition detectors disposed in the plane of the image and having a particular disposition relative to each other and responsive to the image of a particular marking for providing signals representing the relative position of the data field in the image plane;

second means responsive to the relative characteristics of the signals as produced by the detectors of the plurality for laterally shifting the image of the data field as rotated in two transverse directions, so that the rotated data field image has a particular lateral disposition; and data reading means disposed in relation to the particular disposition of the laterally shifted data field image to read the data in the data field.

26. The combination as in claim 25, the first means providing continuous rotation to obtain a periodic search sweep, the plurality of detectors causing the second means to provide lateral adjustment as soon as one of the recognition detectors detects image of a particular marking, to place the rotating data field image into the range of the reading means.

27. The combination as in claim 25, wherein the data field is identified by a circular marking disposed around the data field having data in circular tracks;

the reading means for identifying information in a data field having plural detectors arranged along a first axis;

the second means providing for an adjustment to shift the image so that the data field image rotates about a point on the first axis as center.

28. The combination set forth in claim 27 wherein means are independently responsive to the disposition of the reading means relative to the selective information for independently adjusting the reading means to maintain a particular relationship between the reading means and the image of the data field.

29. The combination set forth in claim 25, wherein two recognition detectors are disposed at spaced positions along a segment of a circle.

30. The combination set forth in claim 29 wherein the data read means are disposed in the vicinity of one of the recognition detectors, and wherein means are provided for adjusting the position of the rotating data field image for the particular marking image to remain tangent to one of the recognition detector.

31. The combination set forth in claim 25 wherein the plurality of detectors include at least a pair of spaced elements for respectively controlling the disposition of the image of the particular image of the marking individually along a pair of transverse axes and wherein the reading means constitute at least a pair of spaced elements.

32. The combination set forth in claim 31, wherein an additional marking is provided within a circular data field and wherein additional detector means are responsive to the additional marking and operate in conjunction with the pair of spaced elements to maintain a particular relationship between at least one of the element means and the image of that particular marking.

33. Apparatus for reading information from a data field having data markings and contrasting marking defining a particular contour, the markings arranged along that contour, the contour marking defining the location of the data field, the data field having random position and random orientation in a particular area, comprising:

first means disposed in relation to the particular area for imaging the particular area including providing an image of the recognition marking and an image of the data markings of a data field when in the particular area;

second means disposed in relation to the first means and including reading means for detecting the image of the data markings when passing through a particular location and providing a signal train representative thereof;

the second means further including a plurality of data field detector means for individually and separately detecting the relative position of the image of the contour marking in the area and providing control signals representative thereof and including at least one particular detector means for detecting the relative position of the image of the contour as representing the disposition of the image of the data markings relative to the reading means;

third means operatively connected for providing relative adjustment between the images as provided by the first means and the second means, without displacement of the data field itself, and including means (a for providing rotational variation of the relative orientation of data field image and the second means, further including means (b) for laterally adjusting the data field image relative to the second means; and fourth means connecting the second means to the third means for obtaining operation of the third means to rotate and to shift the data field image for dispositioning the contour image relative to the particular detector means and causing motion of the contour image relative to the particular detector means in the direction of extension of the contour image in the vicinity of the latter, for the data marking images to pass along the reading means, to obtain progressive readout of the data field by the read means.

34. Apparatus for reading information from a data field having random position in a particular area, as in claim 33, the first means providing an image of the particular area including an image of the data field in a particular plane;

the detector means in the second means including a pair of detectors disposed in the plane of the image in spaced apart relationship and providing signals for the fourth means for controlling lateral position of the image of a data field in the image plane to be tangent at its periphery to two particular peripheral points respectively of the detectors of the pair; and the data read means disposed in relation to the data field image if tangent to the particular points for reading the data contained in the data field.

35. Apparatus as set forth in claim 34 the data field having contrast producing outer boundary for defining recognition marking contour, the second and third means operating to maintain the image of the marking contour tangent to the two particular points, the data field further having a central, contrasting marking, there being at least one additional detector disposed to be at least approximately tangent to an image of the central marking when the image of the outer boundary marking is tangent to the detectors of the pair, and means connected to the additional detector to override control as provided by at least one detector of the pair as to data field image position to control the second means so that image of the central marking is maintained tangent to the additional detector.

36. Apparatus as set forth in claim 35, there being two additional detectors fine-controlling the position of the data field image after having been coarsely positioned by operation of the detectors of the pair and the second means.

37. Apparatus as set forth in claim 34, the data field having a peripheral contrast producing boundary ring, the image thereof being maintained tangent to the particular points by operation of the second means, the data read means including at least one element disposed adjacent to one of the detectors so that the boundary image extends between the element and the one detector.

38. Apparatus as in claim 33, the particular detector means including a detector having position relative to the read means, equivalent to the spacing between the contour image and the arrangement of the data marking images, the second and third means operating to maintain the contour image tangent to the detector means.

39. Apparatus as set forth in claim 33, the data field having circular data tracks and the contour being contour disposed circular contour disposed around a common center, the second means including detectors positioned in particular radial relation to the image of the center of the data field when in the particular position, respectively to detect the contour image and to read the data tracks and providing signals representative thereof, as the data field image rotates about the image of its center by operation of the means (b).

40. Apparatus as set forth in claim 39, the data field having a circular central marking, the detector means including detector means (i) disposed to be responsive to the rotating image of the central marking for providing additional control signals processed in the fourth means to control the third means so as to maintain the read detectors of the second means above the image of the data tracks.

41. Apparatus as set forth in claim 33, the data field having a circular boundary outlined by a recognition marking with circular contour, and extending around a center, the detector means of the second means including a pair of detectors disposed in particular radial position to the center of the data field image when in a particular position and being responsive to the disposition of the possibly distorted contour image for causing the fourth means to operate the third means to maintain the contour image in particular relation to the pair of detectors.

42. Apparatus as set forth in claim 41, the read means disposed in the vicinity of one of the detectors.

43. Apparatus as set forth in claim 41, the detector pair disposed on different sides of a line between said center and the image of the rotational center of the particular area in the absence of a data field therein.

44. Apparatus as in claim 33, wherein the means (a) is included in the first means to provide a rotating data field image, and the means (b) is disposed for laterally shifting the rotating image.

45. Apparatus for reading information established by data markings in a data field on a carrier, having random position and orientation in a particular area and appearing therein at random times, the data field position identified by a contrasting contour marking having particular spatial orientation to the disposition of the data markings in the data field, the combination comprising:

a plurality of detectors disposed in relation to the particular area, at least one detector provided for reading information;

first means disposed between the particular area and the detectors of the plurality for imaging the area and a data field when in the area onto the detectors, at least some of the detectors providing signals respectively in response to detection of an image of a contrasting marking by the detectors;

second means disposed for providing relative displacement between an image as produced by the first means and the detectors and including means (a) for providing lateral displacement in two transversely oriented directions and means (b) for providing angular displacement;

first control means connected to at least some detectors of the plurality and responsive to signals provided by them in response to absence of a data field in the particular area, to control the adjusting means for obtaining continuous periodic search displacement of the imaged area across the detectors;

second control means, connected to the detectors of the plurality, to provide particular control signals respectively in particular response to the first-in-time of the detectors to detect an image of the contour marking, and connected to change control of the second means in dependence upon the respective particular control signal as produced, to provide relative displacement is response thereto, to change the relative position of the image of the detected data field and the reading detector to obtain a reading position.

46. Apparatus as in claim 45, wherein the second means provides lateral and rotating displacement of the data field image, the second control means operating the second means, to obtain lateral, relative shift in a first direction in first-in-time response by a first one of the detectors, and lateral relative shift in a traverse direction in first-in-time response by a second one of the detectors.

47. Apparatus as in claim 46 the second control means operating to place the data field image tangent to at least one of the detectors that is not the reading detector but having spatial relation to the reading detector corresponding to the spatial relation between the images of contour marking and data markings, there being additional control means included to cause the data field image to progressively move past the reading detection in tangent disposition to the latter one detector.